United States Patent [19]

Takada

[11] Patent Number: 4,988,141

[45] Date of Patent: Jan. 29, 1991

[54] FRAME FOR VEHICULAR HOOD

[75] Inventor: Yukiya Takada, Hamamatsu, Japan

[73] Assignee: Suzuki Motor Company Ltd., Hamana, Japan

[21] Appl. No.: 330,116

[22] Filed: Mar. 29, 1989

[30] Foreign Application Priority Data

May 20, 1988 [JP] Japan .................................. 62-123383

[51] Int. Cl.$^5$ ................................................ B60J 1/14
[52] U.S. Cl. ..................................... 296/102; 296/201; 296/146; 292/DIG. 6; 160/369
[58] Field of Search ............... 296/102, 201, 146, 147; 160/369, 371, 379; 135/88, 119; 49/460; 16/110 R, 111 R, 124; 292/288, DIG. 6

[56] References Cited

U.S. PATENT DOCUMENTS

| | | | |
|---|---|---|---|
| 2,130,410 | 9/1938 | Basel | 49/460 |
| 3,147,030 | 9/1964 | Berk | 292/288 |
| 4,086,728 | 5/1978 | Fosseen | 49/460 |

*Primary Examiner*—Dennis H. Pedder

*Attorney, Agent, or Firm*—McGlew & Tuttle

[57] ABSTRACT

A frame having a substantially L-shaped configuration for supporting a vehicular hood, the frame being provided with holding portions for turnably holding the frame on a vehicular body at both the ends and a fixing portion for fixing the frame to the vehicular body by engaging the fixing portion with a fixing member on the vehicular body at the central part thereof, wherein the frame is provided further with a handle in the vicinity of a bent portion thereof, the handle being connected to two points on the frame so as to allow it to be actuated from the inside of a vehicle. The hood can be opened or closed by pushing or pulling the handle adapted to be actuated from the inside of the vehicle. The handle may be jointed to a frame on the vehicular body side via a band or the like means extending therebetween. Consequently, the hood can be closed in a locked state. Moreover, a suitable quantity of wind can be introduced into the interior of the vehicle by keeping the hold in a half-opened state.

4 Claims, 2 Drawing Sheets

FRAME FOR VEHICULAR HOOD

FIELD OF THE INVENTION AND RELATED ART STATEMENT

The present invention relates to a frame usable for a vehicular hood and more particularly to a frame for a vehicular hood of the type including handles for opening or closing side hoods.

A conventional frame for a vehicular hood is typically constructed in the following manner.

FIG. 6 is a front view illustrating a bent portion of the conventional frame, wherein a hood folding portion is not shown in the drawing for the purpose of simplifying the illustration, and FIG. 7 is a sectional view taken along line VII—VII in FIG. 6. As is best seen in FIG. 6, the frame 1 comprises a horizontal portion 1a, a bent portion 1b at a corner and a vertical portion 1c. The end part 2a of a vehicular side hood 2 is wound round them to be firmly secured to it using a Velcro fastener (registered trademark) or the like means. Incidentally, reference numeral 2c designates a window frame made of transparent material.

Both end parts of the frame 1 are designed in the form of turnable holding portions as shown in FIGS. 4 and 5 so that the frame 1 is supported on a vehicular body to turn about a common axis for both the holding portions.

Further, the frame 1 is provided with a slantwise extending member 3 serving as a fixing portion in the vicinity of the bent portion 1b so that the frame 1 is fixed to the vehicular body 5 by engaging the slantwise extending member 3 with a fixing member 4 on the vehicular body 5. The fixing member 4 includes a pair of tongue-shaped members 4a and 4b adapted to define the inner shape in correspondence to the outer shape of the slantwise extending member 3. The fixing member 4 is fixed to the vehicular body 5 at a position corresponding to the slantwise extending member 3 using a screw 6. Thus, the frame 1 can be fixed to the vehicular body 5 by engaging the fixing member 4 (provided within a recess adjacent a step of body 5) with the slantwise extending member 3 by elastic deformation of the tongue-shaped members 4a and 4b.

To prevent wind or rain from being introduced into the interior of a vehicle via the end part of the hood 2, a weather strip 7 is extended along the fixing member 4.

Since the conventional frame is not provided with means for opening or closing the hood 2, there is a need of directly thrusting the hood 2 in the direction as identified by an arrow mark in FIG. 7 when it is to be opened outwardly. Further, while the hood 2 is kept closed, it is difficult to hold it in a locked state from the inside of the vehicle.

OBJECT AND SUMMARY OF THE INVENTION

The present invention has been made with the foregoing background in mind and its object resides in providing a frame usable for a vehicular hood which is entirely free from the aforementioned problems.

To accomplish the above object, the present invention provides a frame for a vehicular hood having a substantially L-shaped configuration for holding the vehicular hood, the frame being provided with holding portions for turnably holding it on a vehicular body at both the ends and a fixing portion for fixing it to the vehicular body by engaging the fixing portion with a fixing member on the vehicular body at the central part thereof, wherein the frame is provided further with a handle in the vicinity of a bent portion thereof, the handle being connected to two points on the frame to be actuated from the inside of a vehicle.

To open or close the hood, the handle is pushed or pulled from the inside of the vehicle. The handle can be jointed to a frame on the vehicular body side via a band or the like means extending therebetween. With this construction, the hood can be kept in a locked state using the handle when it is to be closed. Moreover, a suitable quantity of wind can be introduced into the interior of the vehicle by holding the hood in a half-opened state using the handle.

Advantageous effects provided by the present invention will be noted in the following.

(i) The hood can be opened or closed by actuating the handle without necessity the for pushing or pulling the hood.

(ii) The hood can be locked while it is kept closed or it can be locked while it is held in a half-opened state. At this moment, it is possible to visually confirm from the driver's seat side that the hood is locked.

Other objects, feature and advantages of the present invention will be readily apparent from a reading of the following description which has been made with reference to the accompanying drawings.

BRIEF DESCRIPTION OF THE DRAWINGS

The present invention will be illustrated in the following drawings in which.

DETAILED DESCRIPTION OF THE PREFERRED EMBODIMENTS

Now, the present invention will be described in a greater detail hereinafter with reference to the accompanying drawings which illustrate preferred embodiments thereof.

Figure 6:
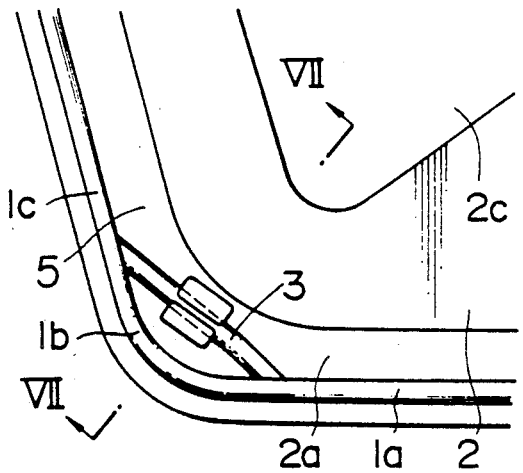
FIG. 6 is a fragmental side view illustrating the bent portion of a conventional frame for a vehicular hood.

A frame 1 comprises a horizontal portion 1a, a bent portion 1b and a vertical portion 1c in the same manner as a conventional frame to exhibit a substantially L-shaped configuration. The frame 1 is turnably secured to a vehicular body 5 at both ends 8 and 9 thereof. A hood 2 is suitably secured to the frame 1 using a Velcro fastener or the like means, while the frame 1 is fully enclosed in the hood 2 in such a manner as shown in FIG. 6. With this construction, to open or close the hood 2, the frame 1 is turned about an axis 10 which is represented by a one-dot chain line in FIG. 1.

Figure 4:
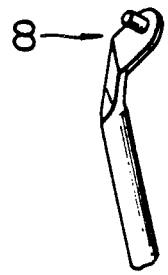
FIG. 4 is a perspective view illustrating an upper end of the frame shown in FIG. 2 according to the invention and according to the prior art.
Figure 2:
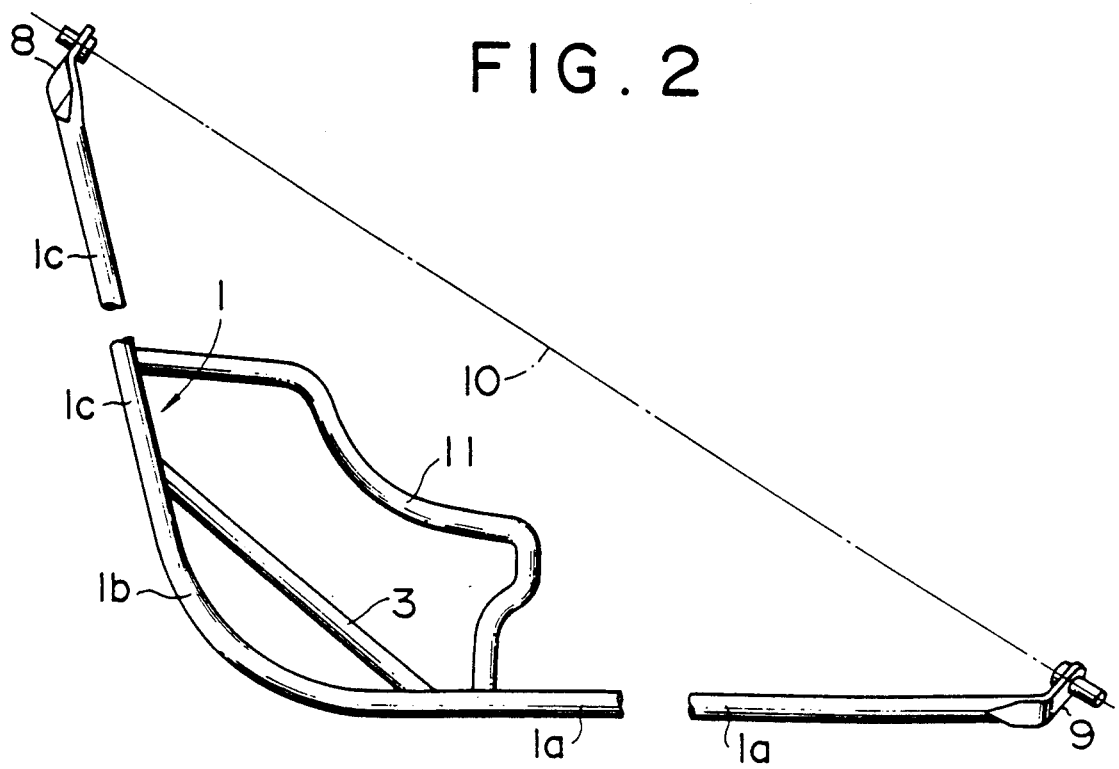
FIG. 2 is a side view illustrating a frame for a vehicular hood in accordance with an embodiment of the present invention, wherein the intermediate parts of the frame are eliminated for the purpose of simplification of illustration.
Figure 5:
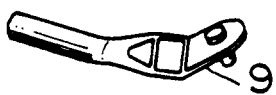
FIG. 5 is a perspective view illustrating a lower end of the frame shown in FIG. 2 according to the invention and according to the prior art.

The frame 1 is provided with a column-shaped protrusion as shown in FIG. 4 at the upper end 8 and another column-shaped protrusion as shown in FIG. 5 at the lower end 9 thereof through which the axis 10 is extended. Thus, the hood 2 can be opened or closed by turning about the axis 10 the frame 1 which has been turnably secured to the vehicular body.

Figure 7:
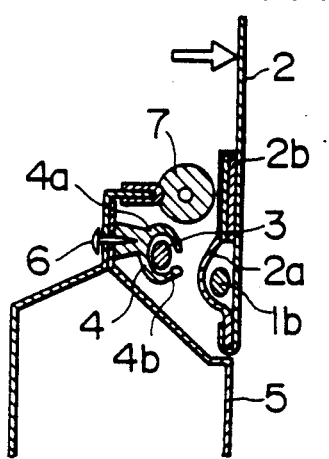
FIG. 7 is a sectional view taken in a line VII—VII in FIG. 6.

Further, the frame 1 is provided with a slantwise extending member 3 serving as a fixing portion in the vicinity of the bent portion 1b in the same manner as the conventional frame shown in FIG. 6. As will be apparent from FIG. 7, the frame 1 is secured to the vehicular body in a closed state by engaging the slantwise extending member 3 with a fixing member 4.

Thus, the aforementioned structure of the frame 1 is substantially similar to the conventional frame. A characterizing feature of the frame 1 in accordance with the present invention consists in that in addition to the aforementioned structure, a handle 11 jutting inside of the vehicular body which is provided in the vicinity of the bent portion 1b of which both ends are connected to each other via the handle 11.

Since the handle 11 is located inside of the hood 2, the latter can be opened or closed by manually pushing or pulling the handle 11.

Figure 8:
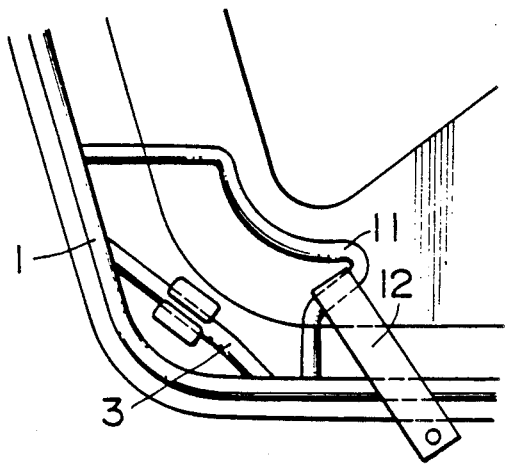
FIG. 8 is a side view illustrating a frame for a vehicular hood in accordance with other embodiment of the present invention, wherein a handle is jointed to the vehicular body via a belt extending therebetween but a hood folding portion is not shown in the drawing for the purpose of simplifying the illustration.
Figure 9:
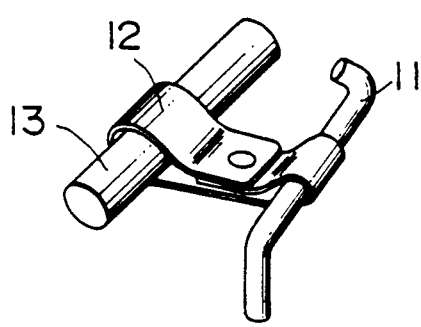
FIG. 9 is a perspective view illustrating that the frame for the hood is jointed to a frame on the vehicular body side using the belt shown in FIG. 8.
Figure 10:
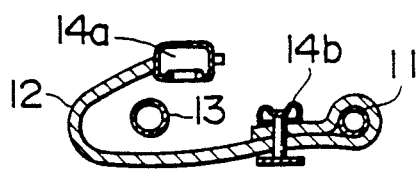
FIG. 10 is a sectional view illustrating a status before the jointed state in FIG. 9 is assumed.

FIGS. 8 to 10 illustrate a frame for a vehicular hood in accordance with another embodiment of the present invention.

Figure 1:
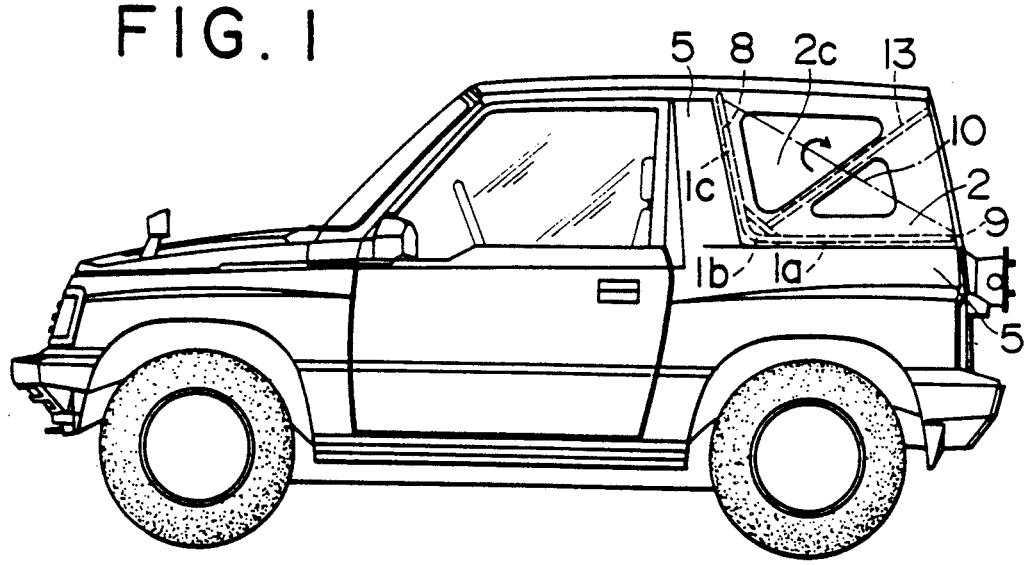
FIG. 1 is a side view illustrating a motorcar having a hood attached thereto for which a frame for a vehicular hood in accordance with the present invention is employed.
Figure 3:
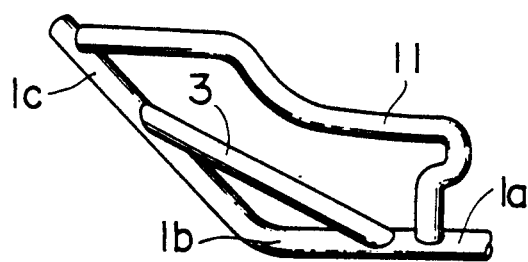
FIG. 3 is a perspective view illustrating a bent portion constituting the frame as seen from the above.

In this embodiment, the frame 13 constituting a part of the vehicular body as represented by dotted lines in FIG. 1 has a handle 11 secured thereto via adjustment means including a belt 12. The hood can be held in a locked state or in a half-opened state using the adjustment means by adjusting a length of the belt 12 while the positions assumed by snap hooks 14a and 14b are adjusted correctly.

I claim:

1. A frame for a vehicle flexible hood, comprising: a substantially L-shaped frame member for supporting a corner of the flexible hood with respect to a corner of the vehicle, said substantially L-shaped frame member having ends with stud members, engaging the vehicle body, and an intermediate bent portion between said ends, said studs being substantially coaxial for rotation of said substantially L-shaped frame member and a corner of the flexible hood about said stud members; a fixing member disposed on the outside of the vehicle body engageable with a fixing portion connected to said substantially L-shaped frame member adjacent said bent portion; a handle connected to said substantially L-shaped frame member at two points, adjacent said fixing portion, said handle jutting out from a plane of said substantially L-shaped frame member and extending into the inside of the vehicle body, whereby the L-shaped frame member and connected corner of the flexible hood may be opened by pushing out from the inside of the vehicle body and may be closed by pulling in from the inside of the vehicle body a belt with a snap hook, said belt being fastened around said handle and being connectable to a part of the vehicle in order to lock the position of said handle, said substantially L-shaped frame member and said connected corner of the flexible hood; and adjustment means for adjusting the position of said belt thereby allowing said substantially L-shaped frame member and said corner of the flexible hood to be locked in an open position.

2. A frame for a vehicle flexible hood according to claim 1, wherein said vehicle part includes a frame support, said belt being connectable to said frame support.

3. A frame for a vehicle flexible hood, comprising: a substantially L-shaped frame member for supporting a corner of the flexible hood with respect to a corner of the vehicle, said corner of the vehicle having an outer side with an inwardly extending recess, said substantially L-shaped frame member having ends with stud members engaging the vehicle body, said studs being substantially coaxial for rotation of said substantially L-shaped frame member about said stud members, said substantially L-shaped frame member and associated corner of the flexible hood being positioned within said recess of the outer side of the vehicle body in a closed state; a fixing member disposed on the outer side of the vehicle body, within said recess, said fixing member engageable with a fixing portion of said substantially L-shaped frame member adjacent a bent portion of said substantially L-shaped frame member; a handle connected to said substantially L-shaped frame member at two points and extending from said two points within the recess on the outside of said vehicle body to a location inside the vehicle body, whereby said substantially L-shaped frame member and said corner of the flexible hood may be opened by pushing said handle outwardly from the inside of the vehicle and may be closed by pulling said handle inwardly from the inside of said vehicle such that said fixing portion engages said fixing member, a belt with a snap hook, said belt being fastened around said handle and being connectable to a part of the vehicle in order to lock the position of said handle, and substantially L-shaped frame member and said connected corner of the flexible hood; and, adjustment means for adjusting the position of said belt thereby allowing said substantially L-shaped frame member and said corner of the flexible hood to be locked in an open position.

4. A frame for a vehicle flexible hood according to claim 3, wherein said vehicle part includes a frame support, said belt being connectable to said frame support.

* * * * *

UNITED STATES PATENT AND TRADEMARK OFFICE
CERTIFICATE OF CORRECTION

PATENT NO. : 4,988,141
DATED : January 29, 1991
INVENTOR(S) : Yukiya Takada

It is certified that error appears in the above-identified patent and that said Letters Patent is hereby corrected as shown below:

Title page item (30):

Please change Foreign Application Priority Data from 62-123383 to:

63-123383

Signed and Sealed this

Thirteenth Day of October, 1992

*Attest:*

DOUGLAS B. COMER

*Attesting Officer*   *Acting Commissioner of Patents and Trademarks*